Figure 1:
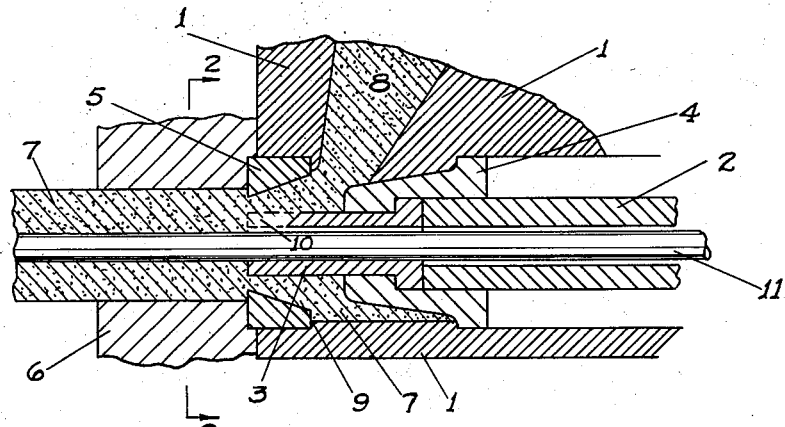

Sept. 12, 1950  E. W. GRANA  2,522,364
ARRANGEMENT IN MANUFACTURING OF
COATED WELDING ELECTRODES
Filed Feb. 27, 1948

INVENTOR.
Ernst W. Grana
BY
James Aiken
Attorney

Patented Sept. 12, 1950

2,522,364

UNITED STATES PATENT OFFICE 2,522,364

ARRANGEMENT IN MANUFACTURING OF COATED WELDING ELECTRODES

Ernst W. Granå, Hammarbyhojden, Sweden, assignor to Allmanna Svenska Elektriska Aktiebolaget, Vasteras, Sweden, a corporation of Sweden Application February 27, 1948, Serial No. 11,486
In Sweden February 12, 1944

Section 1, Public Law 690, August 8, 1946
Patent expires February 12, 1964

3 Claims. (Cl. 18—13)

This application is a continuation-in-part of the prior application for U. S. Letters Patent Serial No. 583,780, filed March 20, 1945, now abandoned and this invention is directed to the coating of wires or rods, and in particular to the coating of arc welding electrodes.

Electrodes are commonly coated either by being dipped in a semi-liquid composition in the same manner as tallow candles are dipped, or by forcing the electrode core wire through a die for the purpose of extruding a coating composition onto the surface of the wire. The latter process is the one preferred for quantity production of coated electrodes. It has the disadvantage in that it is difficult to achieve a coating of uniform thickness upon the wire because the wire, which varies in diameter within its tolerance of manufacture, does not move through the die concentric with the axis thereof and consequently some portions of the wire are more heavily coated on one side than on the other. Such uneven coating adversely affects the use of the electrode during welding operations.

An object of the instant invention is to produce a coating of uniform thickness upon an electrode core wire being forced through an extruding die.

Another object of the invention is to produce an extruding die in which means are provided for holding the electrode core wire in concentric relationship with respect to the coating orifice of the die.

In the usual electrode coating die, a guide sleeve is mounted rearwardly of the outlet die orifice, the axis of the sleeve being aligned with the axis of the die opening. Means are provided for introducing coating material under high pressure about the wire as it leaves the guide sleeve, this coating material being extruded upon the surface of the wire as the wire is pulled through the die opening. Because the wire is not of uniform thickness throughout its length, the guide sleeve must be slightly larger than the maximum diameter of the wire so that the wire can be forced through the sleeve without binding therein. Consequently, when thinner sections of the wire pass through the sleeve, there is sufficient play between the wire and the sleeve to allow the wire to be displaced with respect to the sleeve so that its axis is no longer concentric with that of the sleeve or of the die orifice. This displacement throws the wire off center and results in an uneven coating being applied to the wire as it passes through the die orifice. In the instant invention, this displacement is avoided by using the pressure of the coating composition as it enters the die press, to force the electrode core wire against one side of the guide sleeve, the wire being held against this face of the sleeve regardless of the diameter of the wire. The outlet die orifice is then positioned so that its axis is in alignment with the axis of the wire in its held position on the sleeve instead of being in alignment with the axis of the guide sleeve. Thus, as the wire is held against displacement in the guide sleeve and in alignment with the axis of the die orifice, a uniform coating will be applied to the wire as it is pulled through the die orifice regardless of the change in diameter of the wire.

Figure 2:
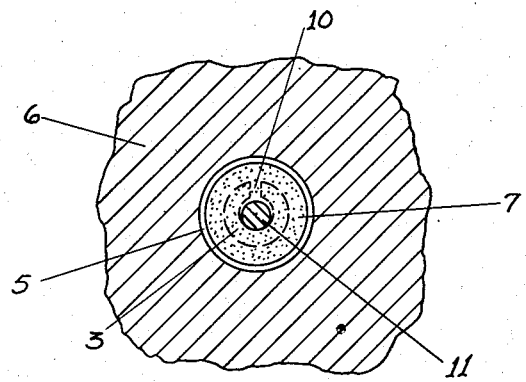

The means by which the objects of the invention are obtained are more fully described with reference to the accompanying drawings, in which:

Fig. 1 is a cross-sectional view through an extruding die press constructed according to this invention; and Fig. 2 is a cross-sectional view along the line 2—2 of Fig. 1.

The die press includes a housing 1 which is bored to receive a first sleeve 2 which is continued into an abrasive resisting guide sleeve 3 joined to the sleeve 2 by means of bushing 4. The forward end of the sleeve 3 is surrounded by a mouthpiece 5, and immediately adjacent this mouthpiece and the end of sleeve 3 is the extruding die 6. The outlet end of sleeve 3 extends to the plane of the outlet side of mouthpiece 5, and thus is substantially at the inlet side of the orifice in die 6. The diameter of the opening in die 6 of course determines the thickness of the coating composition on wire 11. A coating compound 7 is adapted to be forced under high pressure into the die opening from a chamber 8 which is located above sleeve 3. Between mouthpiece 5 and bushing 4 is an annular space 9 surrounding sleeve 3 into which the coating compound flows. On the side of the sleeve 3 adjacent chamber 8 is an opening 10 which is illustrated as a slot or channel extending inwardly from the outlet end of sleeve 3 perpendicular to the bore of sleeve 3, this slot allowing the coating composition to enter into the sleeve and press down upon the electrode wire 11, thus forcing the wire 11 against the bottom of the inner surface of the sleeve.

The axis of the orifice in die 6 is mounted concentric with the axis of wire 11 when said wire is forced against the lower surface of sleeve 3 by the pressure of the composition coating 7. The device operates as follows:

Due to manufacturing tolerances the electrode core wire 11 is not of exact uniform diameter throughout its length. Consequently, the inner diameter of sleeves 2 and 3 must be at least as large as the largest diameter of the core wire, and normally the clearance between the core wire 11 and the sleeves 2 and 3 will be at least from 0.2 to 0.3 mm. Consequently, the wire 11 may be pulled through sleeves 2 and 3 without undue friction. However, when smaller sections of the core wire are pulled through the sleeves a sufficient play exists between the core wire and sleeve 3, which would allow the core wire to be displaced in the sleeve under the action of the pressure of the coating composition 7. This displacement is prevented by means of the opening 10 wherein the pressure of the coating composition is used to force core wire 11 against the inner surface of the sleeve which is opposite the direction from which the pressure of the coating composition is being applied. This holds the wire 11 so that its axis is uniformly substantially exactly aligned with the axis of the die opening in die 6. This opening in the die 6 determines the final thickness of the coating upon the wire, and as the wire is held steady and centrally of the opening as it is pulled through die 6, a uniform coating is achieved upon the wire.

Having now disclosed the means by which the objects of my invention have been obtained,

I claim:

1. A welding electrode coating device comprising a core wire receiving sleeve with a bore at least as large in diameter as the thickest part of the core wire, a coating mass extruding die in alignment with said sleeve close to the exit end of said sleeve, said die having an opening equal to the outer diameter of the coated electrode and having an axis slightly displaced in a lateral direction in relation to the axis of the bore of said sleeve, a supply channel and an annular chamber for the delivery of the coating mass under pressure to the core wire between said sleeve and said die, and a slot extending from the end of said sleeve adjacent said die and terminating short of the other end thereof, said slot being positioned in the wall portion of said sleeve furthest away from the axis of said die to allow the coating mass to exert a force on said wire through said slot and toward the axis of said die.

2. A welding electrode coating device comprising a guide sleeve having an inner diameter greater than the maximum diameter of a core wire being guided through said sleeve, a housing enclosing said sleeve, means in said housing for feeding the coating composition to the core wire to be coated, a cut-out portion in one side of said sleeve admitting the coating composition to the interior of the sleeve, and causing said composition to exert an unbalanced force on the core wire and to force said wire against the inner wall of said sleeve at the side thereof opposite to said cut-out portion, and a die adjacent to the outlet end of said sleeve and mounted eccentrically to said sleeve.

3. A welding electrode coating device, comprising a core wire receiving sleeve with a bore at least as large in diameter as the thickest part of the core wire, a coating mass extruding die in alignment with said sleeve close to the exit end of said sleeve, said die having an opening equal to the outer diameter of the coated electrode and having an axis slightly displaced in a lateral direction in relation to the axis of the bore of said sleeve, a supply channel and an annular chamber for the delivery of the coating mass under pressure to the core wire between said sleeve and said die, and an opening in the wall of said sleeve adjacent to said die and spaced from the end of the sleeve remote from said die, said sleeve opening being restricted to the portion of the said wall furthest away from the axis of the die to permit the coating mass to exert pressure through said sleeve opening and towards the axis of said die.

ERNST W. GRANA.

REFERENCES CITED

The following references are of record in the file of this patent:

UNITED STATES PATENTS

| Number | Name | Date |
| --- | --- | --- |
| 1,633,620 | Alderfer | June 28, 1927 |
| 1,770,985 | Kivley | July 22, 1930 |
| 2,340,808 | Gruetjen | Feb. 1, 1944 |